(12) United States Patent
Sheridan

(10) Patent No.: US 8,200,562 B2
(45) Date of Patent: Jun. 12, 2012

(54) SYSTEM AND METHOD FOR GENERATING A TRANSACTIONABLE MULTIMEDIA FINANCIAL PLANNING STATEMENT

(75) Inventor: Ian Sheridan, Amherst, MA (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 169 days.

(21) Appl. No.: 12/435,097

(22) Filed: May 4, 2009

(65) Prior Publication Data

US 2010/0121780 A1    May 13, 2010

Related U.S. Application Data

(60) Provisional application No. 61/050,456, filed on May 5, 2008.

(51) Int. Cl.
*G06Q 40/00* (2006.01)
(52) U.S. Cl. .................................................. 705/36 R
(58) Field of Classification Search ............... 705/36 R, 705/36
See application file for complete search history.

(56) References Cited

U.S. PATENT DOCUMENTS

| | | | |
|---|---|---|---|
| 5,471,575 A * | 11/1995 | Giansante | 715/202 |
| 6,012,044 A * | 1/2000 | Maggioncalda et al. | 705/36 R |
| 6,018,722 A * | 1/2000 | Ray et al. | 705/36 R |
| 6,285,991 B1 | 9/2001 | Powar | |
| 6,405,179 B1 | 6/2002 | Rebane | |
| 6,957,191 B1 | 10/2005 | Belcsake et al. | |
| 7,016,870 B1 | 3/2006 | Jones et al. | |
| 7,062,458 B2 | 6/2006 | Maggioncalda et al. | |
| 7,249,080 B1 * | 7/2007 | Hoffman et al. | 705/36 R |
| 7,529,704 B1 * | 5/2009 | Breslow et al. | 705/37 |
| 7,552,079 B2 * | 6/2009 | Bove et al. | 705/36 R |

(Continued)

FOREIGN PATENT DOCUMENTS

GB   2386451   9/2003

OTHER PUBLICATIONS

Jones, Dominic: Improving the usability of financial statements, Feb. 19, 2002, IR Web Report, pp. 1-10.*

(Continued)

*Primary Examiner* — Bijendra K Shrestha
(74) *Attorney, Agent, or Firm* — Goodwin Procter LLP

(57) ABSTRACT

A system and method for providing a secure electronic transactionable multimedia financial planning statement to a financial plan holder, in which financial goals are obtained, financial holdings of the plan holder are analyzed, and the financial statement is provided to the plan holder. The financial statement includes a summary of financial information with an analysis of the financial holdings, an identification of weaknesses in the financial holdings, and suggestions to the financial plan holder to remedy the weaknesses in the financial holdings. Moreover, a transaction option is provided in the electronic financial statement, which enables the plan holder to execute one or more transactions. A multi-media interpretation is provided within the statement to provide the financial plan holder with training, guidance, and to answer questions submitted by the plan holder.

21 Claims, 4 Drawing Sheets

U.S. PATENT DOCUMENTS

| | | | |
|---|---|---|---|
| 7,577,597 B1* | 8/2009 | Allison et al. | 705/35 |
| 7,822,671 B1* | 10/2010 | Oros | 705/36 R |
| 7,895,102 B1* | 2/2011 | Wilks et al. | 705/35 |
| 2001/0011242 A1 | 8/2001 | Alex et al. | |
| 2001/0032182 A1 | 10/2001 | Kumar et al. | |
| 2001/0037276 A1 | 11/2001 | Kelly et al. | |
| 2002/0091635 A1 | 7/2002 | Dilip et al. | |
| 2003/0028464 A1 | 2/2003 | Kosinski | |
| 2003/0126054 A1 | 7/2003 | Purcell | |
| 2003/0172014 A1 | 9/2003 | Quackenbush et al. | |
| 2003/0208427 A1 | 11/2003 | Peters et al. | |
| 2004/0030626 A1 | 2/2004 | Libman | |
| 2004/0054610 A1* | 3/2004 | Amstutz et al. | 705/36 |
| 2004/0153389 A1 | 8/2004 | Lortscher, Jr. | |
| 2004/0193515 A1 | 9/2004 | Peterson et al. | |
| 2005/0010510 A1 | 1/2005 | Brose et al. | |
| 2005/0010516 A1* | 1/2005 | Ivanov et al. | 705/36 |
| 2005/0137953 A1 | 6/2005 | McDonough et al. | |
| 2005/0144096 A1 | 6/2005 | Caramanna et al. | |
| 2006/0080200 A1 | 4/2006 | Ashton et al. | |
| 2006/0282380 A1 | 12/2006 | Birney et al. | |
| 2007/0027736 A1 | 2/2007 | Reynolds et al. | |
| 2007/0038542 A1 | 2/2007 | Armstrong et al. | |
| 2007/0079335 A1* | 4/2007 | McDonough | 725/58 |
| 2009/0055327 A1* | 2/2009 | Jones et al. | 705/36 R |

OTHER PUBLICATIONS

Wilson, Clay: Avatars, Virtual Reality Technology, and U.S. Military: Emerging Policy Issues, CRS Report for Congress. Apr. 9, 2008, pp. 1-6.*

Lamm et al.: Real-time geographic visualization of world wide web traffic, 1996, Computer Networks and ISDN Systems, 18, pp. 1457-1468.*

Oliveira et al.: Collaborative virtual environment for industrial training and commerce, University of Ottawa, Canada, 2000, pp. 1-5.*

Jack Henry & Associates, Inc.: author unknown; "Credit union-branded member communications systems"; p. 1; 2007; Symitar website.

TheStreeet.com. Inc.; author unknown; "The Interactive Income Statement"; pp. 1-2; Feb. 23, 1999; TheStree.com website.

EDGAR Online, Inc : author unknown; "Greater Insight. Greater Output.": pp. 1-2; 2006: EDGAR Online website.

The Wall Street Journal; Rob Lieber; "Getting Younger Folk to Save: Parents, Employers Can help 20-Somethings Build Nest Egg Early"; pp. 1-5; Jun. 17, 2006; WSJ Online Newspaper.

Defined Contributions News; Julie Segal; "Retirement Providers Develop Income Analysis Tools"; p. 1; Jul. 22, 2005; http://www.dcnews.com.

* cited by examiner

SYSTEM AND METHOD FOR GENERATING A TRANSACTIONABLE MULTIMEDIA FINANCIAL PLANNING STATEMENT

CROSS-REFERENCE TO RELATED APPLICATIONS

This application claims the benefit of the earlier filing date of U.S. Provisional Application No. 61/050,456 filed May 5, 2008, entitled "System and Method for Generating a Transaction Enabled Electronic Statement Providing Interactive Guidance and Interpretation" the entirety of which is incorporated herein by reference.

BACKGROUND

Generally, the present invention relates to systems and methods for providing secure electronic transactionable multimedia financial planning statements.

Financial planning is a difficult endeavor for many ordinary investors. It is such a difficult task that an entire industry has been created to advise investors in their financial planning. In this field, there are two predominant activities which are conventionally undertaken by these entities: planning an investment strategy for an investor, and benchmarking investment options available to the investor.

Planning an investment strategy for an investor can take many forms. In some instances, a financial planner will project the future retirement income needs of an investor and then determine a standard investment contribution that, when projected to future net worth and holdings, equals those future retirement income needs. This process has traditionally been accomplished through investment questionnaires given to investors and personal interviews with the investor to gauge the investor's desires.

Another form of investment planning can take the form of assessing the risk tolerance and investment horizon of an individual investor and determining a financial plan based off of that risk tolerance and horizon. Questionnaires and personal interviews are often used in calculating and assessing these variables. After gathering and compiling this information, a possible financial strategy is presented to the investor. This strategy typically also includes a future net worth and holdings calculation.

Some of the financial advice given by various institutions is tied to product and service recommendations. These recommendations may be based on the advice in the form of formulated financial plans or based off of the articulated goals of the investor. The products or services recommended are typically from vendors or brokers which have arrangements with the advising entity.

Benchmarking investment options and returns are additional services provided to investors by advising entities. Some entities measure the overall performance of an individual retirement plan or fund and compare that performance with other plans or funds in the same space. Others may project that plan or fund against the investor's income requirements for retirement, or compare the plan's performance against the stated goals of that plan. Other entities may create a visualization or analysis of a given plan or fund for comparison with other similar funds or other investment strategies.

Unfortunately, many of these products and services yield suboptimal results. Many consumers have had difficulty understanding the methods involved in calculating these benchmarks and plans, and still others have difficulty understanding the basics of finance or other account management principles. Further, so many of these methods are based off of questionnaires and not dynamically generated in response to the actual holdings of an investor.

No widely accepted or available system exists which allows a customer to have a complete understanding of the current holdings in an investment or other account, know the performance of that account relative to other considerations, learn of recommendations to optimize those holdings, and take immediate action based on that information.

A reliable, effective, and appropriate method of managing a customer's accounts in light of investment advice and objectives will help solve many of the aforementioned drawbacks of financial or other account advising systems on the market. Unfortunately, as has been evidenced above, no such management system has been created.

It should be readily apparent to those skilled in the art that the above structures and others of their kind do not satisfactorily address the informational and management needs of customers regarding financial and other account planning, leaving account holders in the dark when attempting to proactively manage one or more accounts amongst the numerous courses of action available.

Accordingly, a system and method for providing secure electronic transactionable multimedia financial planning statements is provided to enable transactions and provide interactive guidance and interpretation.

SUMMARY OF EXEMPLARY ASPECTS OF THE ADVANCEMENTS

In one aspect, a method and system of providing a secure electronic transactionable multimedia financial planning statement is disclosed. The method includes receiving one or more financial goals from a financial plan holder, analyzing financial holdings of the financial plan holder, and providing a summary of financial information for the financial plan holder.

The summary provides an analysis of the financial holdings and the goals of the financial plan holder, identifies weaknesses in the financial holdings, and provides suggestions to the financial plan holder to remedy the weaknesses in the financial holdings.

The method also includes providing a transaction option in the financial statement, the transaction option enabling the financial plan holder to execute one or more secure financial transactions, and providing a multi-media enabled interpretation of the financial statement.

The interpretation provides guidance for the financial plan holder, training for the financial plan holder, and responds to questions submitted by the financial plan holder.

In a further aspect of the invention, the secure electronic transactionable multimedia financial planning statement is provided through an email to the financial plan holder.

In a further aspect of the invention, secure electronic transactionable multimedia financial planning statement is provided through a website.

In a further aspect of the invention, the suggestions to the financial plan holder are based on a questionnaire submitted by the financial plan holder.

In still a further aspect of the invention, the suggestions to the financial plan holder are based on analysis of the financial goals of the financial plan holder.

In still a further aspect of the invention, the suggestions to the financial plan holder are based on financial predictions and/or historical performances of holdings.

In still a further aspect of the invention, the suggestions to the financial plan holder are based on a risk tolerance of the financial plan holder.

In still a further aspect of the invention, the transaction option is based on the suggestions to the financial plan holder to remedy the weaknesses in the financial holdings.

In still a further aspect of the invention, the multi-media enabled interpretation includes textual queries, selectable queries, speech recognition, and/or visual graphs.

In still a further aspect of the invention, the secure electronic transactionable multimedia financial planning statement further includes a transaction history listing various transactions into and out of an account of the financial plan holder.

In still a further aspect of the invention, the account of the financial plan holder contains multiple sub-accounts, and the secure electronic transactionable multimedia financial planning statement contains a summary of financial information for the multiple sub-accounts.

In still a further aspect of the invention, the goals of the financial plan holder correspond to investment goals, retirement goals, and/or financial plan goals.

In still a further aspect of the invention, the financial plan holder is an enterprise customer.

It is to be understood that both the foregoing general description of the invention and the following detailed description are exemplary, but are not restrictive, of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Embodiments of the present invention are directed to systems and methods for secure electronic transactionable multimedia financial planning statement generation with enhanced transaction capability.

Figure 1A:
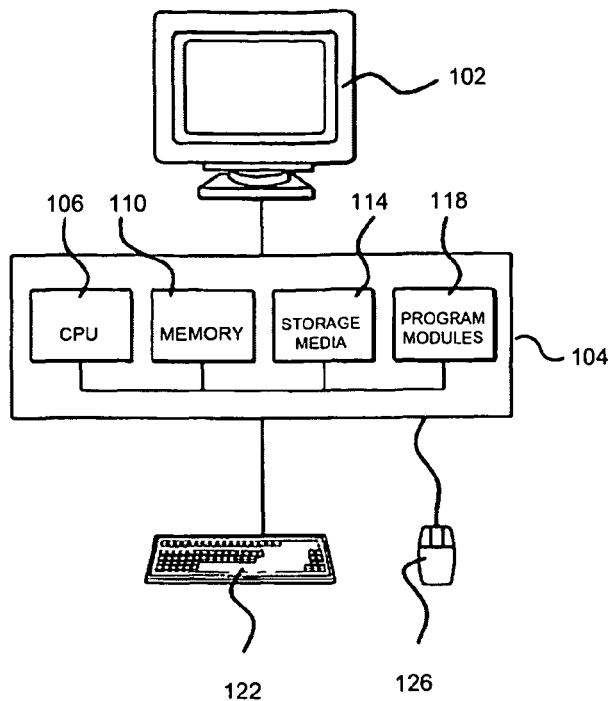
FIG. 1a illustrates a high level block diagram of a computer system on which the system and method for generating a secure electronic transactionable multimedia financial planning statement may be implemented and/or accessed.
Figure 1B:
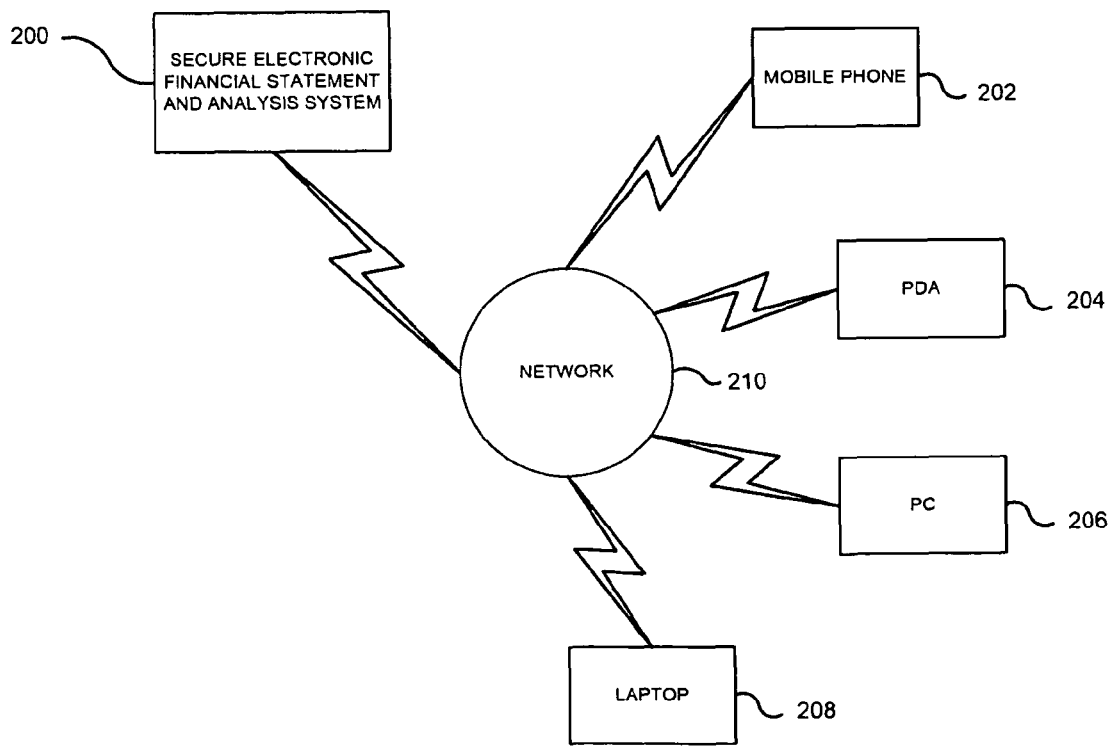
FIG. 1b illustrates a block diagram of the communication network through which the system and method for generating secure electronic transactionable multimedia financial planning statement may be accessed by one of a plurality of access devices.

FIG. 1a shows a computer system 104 on which the system and method for generating a transaction enabled multimedia electronic statement 201 providing a gap analysis, recommendations, and multi-media interpretations may be accessed, and FIG. 1b shows a communication network 210 for the same.

The statement and analysis system 200 may include instructions executed on a computer. The statement and analysis system 200 may be or include a computer system 104. The statement and analysis system 200 may be described in the general context of computer-executable instructions, such as program modules, being executed by a computer. Generally, program modules 118 include routines, programs, objects, components, data structures, etc. that perform particular tasks.

Those skilled in the art will appreciate that the invention may be practiced with various computer system 104 configurations, including hand-held wireless devices such as mobile phones 202 or PDAs 204, multiprocessor systems, personal computers 206, microprocessor-based or programmable consumer electronics, minicomputers, mainframe computers, laptops 208, and the like.

The invention may also be practiced in distributed computing environments where tasks are performed by remote processing devices that are linked through a communications network 210. In a distributed computing environment, program modules 118 may be located in both local and remote computer storage media 114 including memory storage devices.

The computer system 104 may include a general purpose computing device in the form of a computer including a processing unit 106, a system memory 110, and a system bus that couples various system components including the system memory 110 to the processing unit 106.

Computers typically include a variety of computer readable media that can form part of the system memory 110 and be read by the processing unit 106. By way of example, and not limitation, computer readable media may comprise computer storage media 114 and communication media. The system memory may include computer storage media 114 in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit 106.

The data or program modules 118 may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, the Apache™ operating system, an OpenStep™ operating system or another operating system or platform.

At a minimum, the memory 110 includes at least one set of instructions that is either permanently or temporarily stored. The processor 106 executes the instructions that are stored in order to process data. The set of instructions may include various instructions that perform a particular task or tasks. Such a set of instructions for performing a particular task may be characterized as a program, software program, software, engine, module, component, mechanism, or tool.

The statement and analysis system 200 may include a plurality of software processing modules stored in a memory 110 as described above and executed on a processor 106 in the manner described herein. The program modules 118 may be in the form of any suitable programming language, which is converted to machine language or object code to allow the processor 106 or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module.

The computing environment may also include other removable/nonremovable, volatile/nonvolatile computer storage media 114. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD ROM or other optical media. Other removable/nonremovable, volatile/nonvolatile computer storage media 114 that can be used in the exemplary operating environment include, but are not limited to, magnetic tape cassettes, flash memory cards, digital versatile disks, digital video tape, solid state RAM, solid state ROM, and the like. The storage media 114 are typically connected to the system bus through a removable or non-removable memory interface.

The processing unit 106 that executes commands and instructions may be a general purpose computer, but may utilize any of a wide variety of other technologies including a special purpose computer, a microcomputer, mini-computer, mainframe computer, programmed micro-processor, microcontroller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors 106 and/or memories 110 of the computer system 104 need not be physically in the same location. Each of the processors 106 and each of the memories 110 used by the computer system 104 may be in geographically distinct locations and be connected so as to communicate with each other in any suitable manner. Additionally, it is appreciated that each of the processor 106 and/or memory 110 may be composed of different physical pieces of equipment.

A user may enter commands and information into the computer through a user interface that includes input devices such as a keyboard 122 and pointing device, commonly referred to as a mouse 126, trackball or touch pad. Other input devices may include a microphone, joystick, game pad, satellite dish, scanner, voice recognition device, touch screen, toggle switch, pushbutton, or the like. These and other input devices are often connected to the processing unit 106 through a user input interface that is coupled to the system bus, but may be connected by other interface and bus structures, such as a parallel port, game port or a universal serial bus (USB).

One or more monitors 102 or display devices may also be connected to the system bus via an interface. In addition to display devices, computers may also include other peripheral output devices, which may be connected through an output peripheral interface. The computers implementing the invention may operate in a networked 210 environment using logical connections to one or more remote computers, the remote computers typically including many or all of the elements described above.

Various networks 210 may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter.

When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications.

Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths. For some aspects of the invention, such as for the transfer of payments, the communications infrastructure may include networked systems such as the Electronic Funds Transfer (EFT) network, trade exchanges, and other communication channels known in the industry for implementing trading transactions (which may include settlement operations) such that those described herein.

Although many other internal components of the computer are not shown, those of ordinary skill in the art will appreciate that such components and the interconnections are well known. Accordingly, additional details concerning the internal construction of the computer need not be disclosed in connection with the present invention.

According to various aspects or embodiments of the invention, any of the various above-mentioned computer-oriented systems may be used or applied to the collection, processing, formatting, presentation, or other use or dissemination, of data or information in the present invention. Further, aspects and embodiments of the invention may utilize any of the above mentioned computer-oriented technology in performing or accomplishing any of the above or below mentioned processes or methods.

In some of the various embodiments of the present invention, a customer may have an account with an institution. In aspects of the invention, the institution may be a financial institution, an investment broker, a life insurance broker, or any other entity which provides accounts that relate to credits or debits of the customer.

In some embodiments, the accounts may include sub-accounts which could relate to investments of the customer, individual lines of credit of the customer, individual bank accounts of the customer, certificates of deposit, personal or business loans, insurance policies, cash value associated with insurance policies, annuities or other over-time payments owed to or by the customer, asset or inventory accounts, equity accounts, other types of asset or liability accounts, or any other type of account accessible to the customer, whether directly with or accessible to the institution.

In various embodiments, the institution may provide periodic or on-demand statements to the customer regarding the customer's account. In some embodiments, the statement may be in the form of an electronically accessible statement. For example, in some aspects of the present invention the electronically accessible statement may be accessed through a web browser connected to the Internet.

There, a website displaying the electronically accessible statement may be protected with an online security mechanism. In various aspects of the invention, this security mechanism may include secure servers (https), digital certificates, public and private key security, logins and passwords for user account access, or any other mechanism that may be appreciated by those of skill in the art. Some embodiments contemplate the statement being received on a cell phone 202, a mobile device, a vehicular display, an ATM, a remote kiosk, a computer 206, or any other system connected to a network 210 such as the Internet and/or capable of receiving electronic communications.

Figure 2:
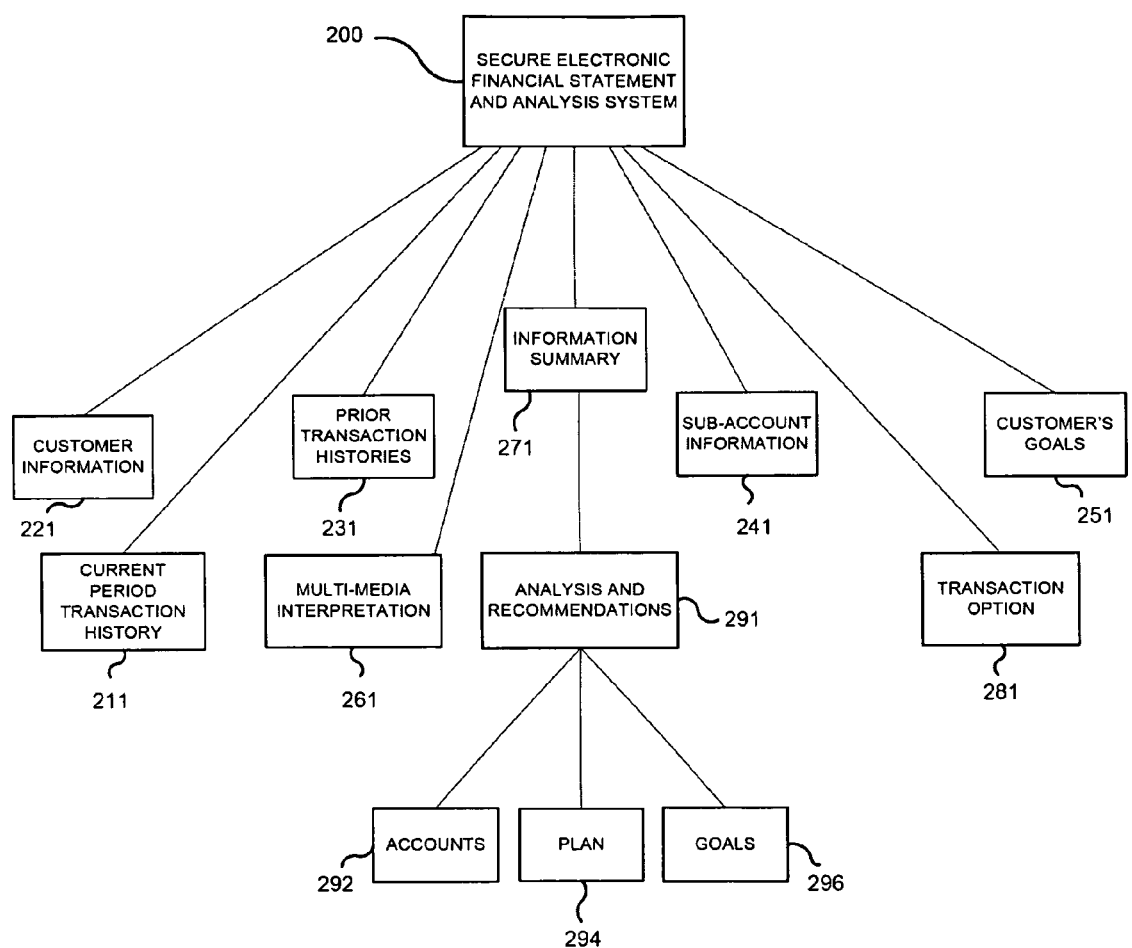
FIG. 2 illustrates a block diagram of the system and method for generating a secure electronic transactionable multimedia financial planning statement.
Figure 3:
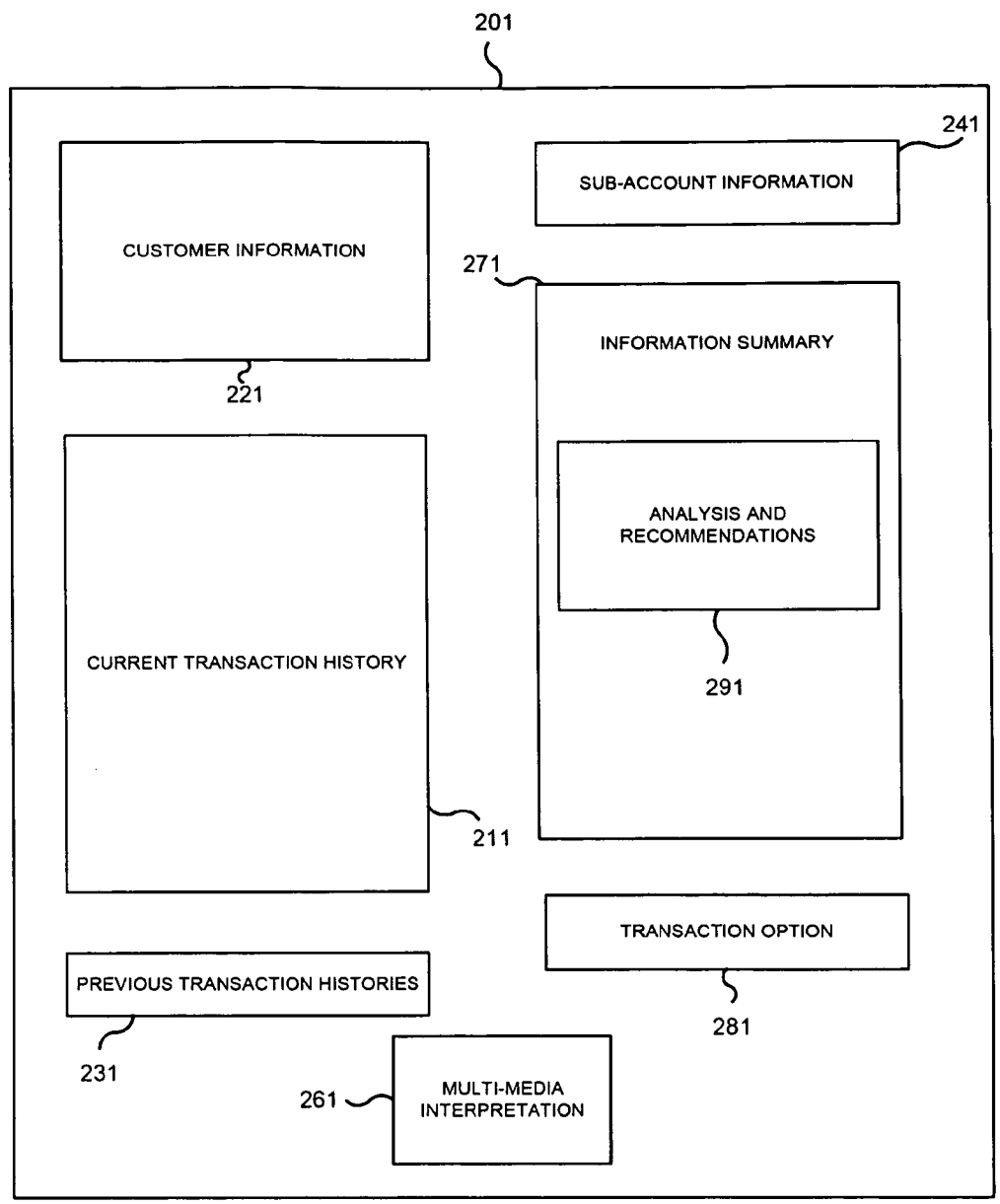
FIG. 3 illustrates an exemplary diagram of the layout for a secure electronic transactionable multimedia financial planning statement according to an embodiment of the present invention.

FIGS. 2 and 3 show various parts of an exemplary embodiment of the system and method for generating a transaction enabled multimedia electronic statement 201. According to various embodiments, the statements provided by the institution may display or otherwise present information pertinent to the customer's account.

In some aspects of the invention, this information may include a transaction history 211 during the period for which the statement applies, including a listing of various transactions into and out of the customer's account, as well as the status of any invested funds if the account is an investment account; the customer's account number; the customer's address; any other customer information 221, such as the date the customer became a customer of the institution; transaction histories 231 relating to periods prior to that of the current statement; if the account contains multiple sub-accounts 241 or investments, then a listing of those individual investments and their representative transactions or status; or a summary of any of the information detailed on the statement or otherwise accessible to the institution.

In some embodiments of the present invention, a statement may also include a description—graphical, textual, oral, or otherwise—of the customer's goals 251 for the account at the institution. In some of those embodiments, the goals may be investment or retirement goals 296 related to an investment account 292. According to some aspects, those goals may correspond to a financial plan 294 of the customer.

In various embodiments of the present invention, goals may be changed on the transaction enabled multimedia electronic statement 201 at any time, subject to the rules of the plan and the technology platform. For instance, some platforms allow for change not more than one time in a 24 hour time period, yet other methods of changing the goals are also considered.

In various embodiments of the invention, the electronically accessible statement 201 may present an analysis 291 of any of the customer's accounts 292, financial plan 294, or goals 296. In some aspects, this analysis 291 may be solicited by the consumer in the form of selectable options or answers to questions relating to usage of the account. In other aspects, the analysis 291 may be presented automatically along-side the other elements of the statement.

Because the electronically accessible statement 201 is very dynamic in nature, one embodiment of the present invention includes a button, link, or selectable option on the statement for allowing the financial plan holder to convert the statement to a different version in order to save the statement as a local file. For instance, the electronically accessible statement 201 may include a button or interface allowing the user to save the electronically accessible statement 201 as a file such as a portable document format (PDF) version or a Microsoft Word version.

In some aspects, each line-item in the statement may include corresponding analysis or recommendations 291. In other aspects, an information summary 271 including an analysis or recommendation 291 may accompany each statement, sub-account described in the statement, or any other subset of the statement. In some embodiments, this analysis 291 may take the form of graphical representations of data 261 (such as video, charts, graphs, or other graphical representations appreciated by those in the art), textual representations of data, or oral representations of data.

According to some embodiments of the present invention, an analytical component 291 of the statement may apply gap analysis to determine areas of potential weaknesses in a customer's accounts and suggest possible improvements. In some aspects of the invention, this analysis 291 may be conducted by determining the net holdings, which may include assets, liabilities, inventory, or other account components, of the account or the customer.

The analytical component may then compare the current performance or utilization of those net holdings with possible or optimal allocations of those holdings. If the comparison in performance or utilization results in a determination that holdings are being under-utilized, the analytical component may present that analysis to the customer in the electronic statement 201.

The gap analysis and/or future financial need assessment may include a variety of algorithms that contemplate things such as income replacement, and general related retirement expense considerations, such as long term care expenses.

According to some aspects of the invention, other, more optimal allocation or utilization strategies or options may be presented in the analysis for the customer. If the comparison in performance or utilization results in a determination that holdings are being efficiently-utilized, the analytical component may present that analysis to the customer in the electronic statement 201.

In various aspects, the gap analysis 291 performed may also be based upon the customer's stated financial plan 294 or account goals 296, the expectations in the market or in areas related to the holdings of the account, the historical performance of various possible allocations of holdings of the account, or any other information related to the assets of the account or the customer.

The analysis 291 may also suggest changes and improvements to the account holder's financial holdings or plan 294 based on the account holder's financial objectives or information contained in the financial statement. These recommendations 291 for improvement may include, for example, changing allocations of assets among holdings, increasing contributions, diversifying holdings or other strategies.

As a non-limiting example, the recommendation section of the secure electronic financial statement may suggest, "You are on track with your investment goals, but could increase your 401K investment by 5% to ensure that your investment goals are met." The above recommendation could correspond to a transaction option allowing the user to follow the recommendation and execute the transaction in real-time via the transaction enabled multimedia electronic statement 201.

According to various embodiments of the present invention, the analytical component may compare the account goals 296 of the customer with the performance of the account. In some aspects, this analysis may take the form of determining the usage of the account 292 over a period of time. According to one aspect of the invention, the usage may include the credits and debits in a financial account.

For example, in an investment account the analytical component could measure the amount contributed into the account from the customer over a set period of time. In another aspect, the usage may include the average holdings of the account. For example, in an inventory account, the analytical component could measure the average inventory held in the account over a set period of time. After determining the usage of the account, the analytical component may then compare that usage with predetermined or newly determined (either through a series of vetting questions or other compilation of data available to the component) retirement, savings, credit, inventory, or other account-related goals.

In various other embodiments, the electronically accessible statement 201 may be directed towards an enterprise customer. In some of those embodiments, the enterprise customer may be an entity with employees that have retirement accounts with the account provider, a pension fund, an entity with multiple accounts or subsidiaries containing accounts with the account provider, or any other large customer with multiple accounts with the account provider.

Some aspects of the invention may enable an enterprise statement to be generated. That enterprise statement may include summaries or complete statements of the individual accounts held or managed by the enterprise. In some of those aspects, the analytical component may compile aggregations of the individual account analyses for the enterprise statement.

The enterprise analysis may include any of the components or aspects of the individual account analysis. The enterprise analysis may also include suggestions for new products, services, or other offerings for the enterprise to use or for the enterprise to offer to its employees or individual account holders. Suggestions may be derived from individual account statistical usage data or other data available to the statement and analysis system 200.

In some of the embodiments of the present invention, the electronically available statement 201 may be transaction 281 enabled. In some of those embodiments, the statements 201 would allow an customer to complete a transaction 281 from the statement 201 itself.

For example, the customer could change the asset allocation in the financial plan or change his or her periodic contributions to a financial plan from an electronic statement 201. In other embodiments, the customer could modify inventory or other holding requirements or thresholds from the statement.

In yet other embodiments, enterprise customers could modify the options available to accounts and account holders within the enterprise from within the enterprise statement. In some aspects, these modifications may occur by the adjustment of a slider bar, the change of a numerical value, the selection of a radio button or check box, a selection within a drop down menu, clicking on a link, or otherwise interacting with the statement 201.

In some aspects of the invention, any analysis or recommendations 291 accompanying or included in the statement 201 may be followed or subscribed to by selecting the advice or recommendation. Selection of advice may occur by clicking, responding to a dialog, completing an embedded form, any other selection mechanism known to those in the art, or any combination of these mechanisms. According to various aspects of the invention, the transactions 281 enabled in the account holder's financial statement 201 would be secure and utilize encryption or other methods of security known to those in the art for guaranteeing transaction security.

According to some embodiments or aspects of the invention, an end user of the system or method may be presented with an online or otherwise computer-based interface. Some aspects of the invention may present the user with selectable or filterable results or options from which a user may select the types of accounts, sub-accounts, advice, recommendations, transactions, or presentation methods he or she wishes to see. In some aspects, the statements 201 presented through the interface may be contained on a single viewable space or multiple viewable spaces. In some of those aspects, multiple viewable spaces may be linked through hyperlinks or other selectable mechanisms.

According to some embodiments or aspects of the invention, an end user may receive an email of the electronic statement 201, which would contain embedded hyperlinks to create the web enabled link. The link may be performed by other means, as one with skill in the art would surely recognize.

In the preferred embodiment, the financial statement may enable an avatar presenting a video review 261 of the statement 201. In one of the aspects of the invention, the avatar may automatically begin a review or analysis of the statement upon display of the statement 201. In other aspects of the invention, the avatar may present reviews or analysis based upon individual elements of the statement 201 that are selected by the customer.

Selection by the customer may include hovering over an element of the statement 201 with the mouse 126 or other input device, or clicking on an element (such as an icon indicating a review is available for that part of the statement 201) in the statement 201.

According to various embodiments, the avatar may be interactive. The avatar may be able respond to the customer's or account holder's inquiries and requests. According to various aspects, the customer or account holder may be able to interact with the avatar using textual queries, selectable queries (such as predetermined or commonly asked questions presented for selection to the customer), audio explanations, or though speech recognition technologies.

In some embodiments, the avatar may also provide training, guidance, or suggestions in addition to a review of the statement 201. In some of these embodiments, the avatar may be enabled to explain terminology used on the statement 201, describe the analytical methods employed in generating recommendations for the customer, or explain any graphs or other visual elements of the statement. In other embodiments of the invention, the avatar may be customized for the customer's preferences or needs. In one such embodiment, the avatar may be customized for handicapped customers or customers requiring other accessibility assistance.

Having described a number of different embodiments of the invention, it should be apparent to the person of ordinary skill that the invention has numerous benefits and advantages. For example, the invention provides a simple and informative way for customers with account-based institutions to understand their financial statements at a time and place they choose and to be informed as to the performance of those accounts relative to the customer's goals.

Figure 4:
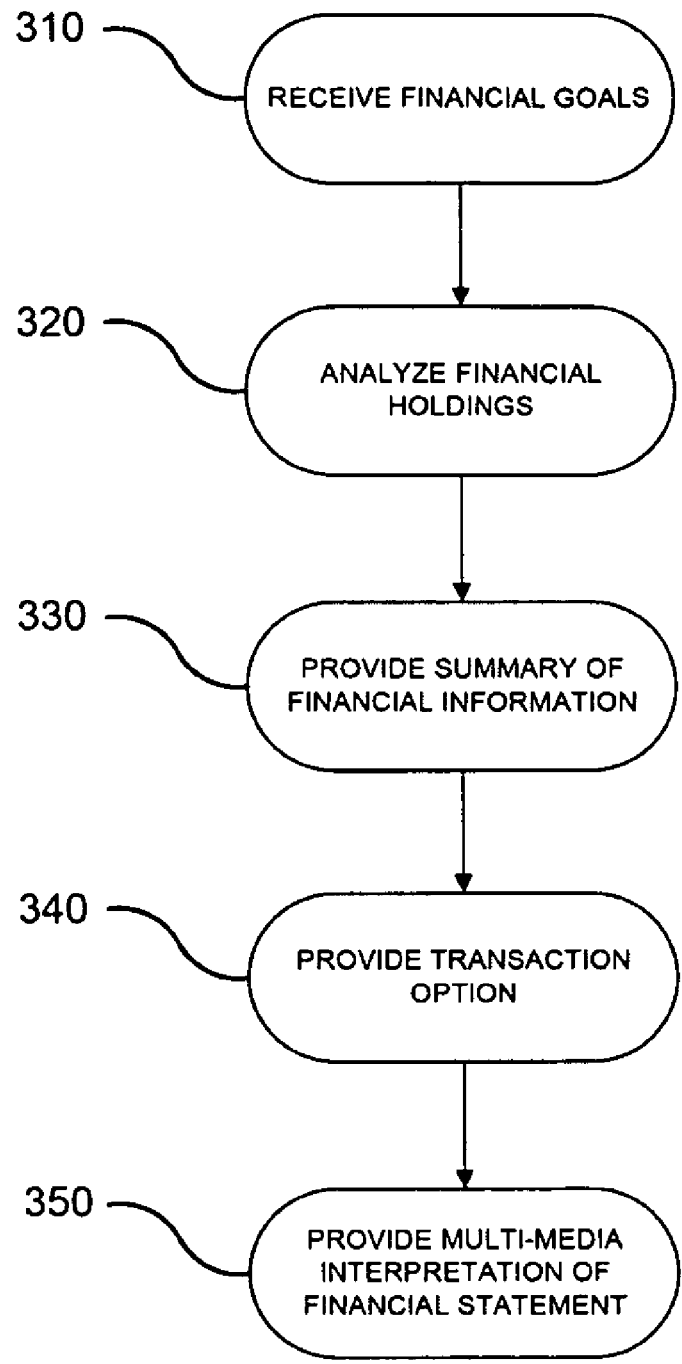
FIG. 4 illustrates a flow process diagram of the exemplary system and method for generating a secure electronic transactionable multimedia financial planning statement.

With respect to FIG. 4, the exemplary system and method for generating a transaction enabled electronic statement 201 is shown. The ability to not only explain the account statement through a summary of financial information 330, but to also analyze the statement 320 in light of received goals of the customer 310, recommend actions to take based off of that analysis, explain the analysis 350 to the user in a straightforward way, and enabling a user to immediately utilize that advice through a transaction enabled 340 interface provides a customer with a level of simplicity and control that has previously not been possible.

The various styles of accounts, account analysis and recommendations, and ability to immediately implement those recommendations allows customers to take advantage of their holdings and act as their own analyst in a concise, simple, and effective manner that encourages proactive management of financial and other accounts.

The invention provides particular benefits to retirement and financial investors that have traditionally avoided actively managing their investment funds because of uncertainty of the strategy those investors should employ in light of the life of their investment term, their personal investment goals, or the direction those individual target funds may take. More simple investment management and understanding in this more user-friendly account management and presentment system is now possible by application of the principles of the invention to traditionally difficult to manage investment accounts.

Because the invention allows account holders to more effectively manage and understand their account holdings, individuals once afraid of continually and proactively managing a financial or other accounts will no longer be scared away from such activities. Other benefits and advantages of the invention will be apparent to the person of ordinary skill in the art.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology.

I claim:

1. A method of providing a secure electronic transactionable multi-media financial planning statement to a financial plan holder via a computing device, the method comprising:
    receiving one or more financial goals from the financial plan holder through the computing device;
    analyzing financial holdings of the financial plan holder using a computer processor;
    providing the financial statement to the financial plan holder, the financial statement including a summary of financial information, the summary of financial information including an analysis of the financial holdings, an analysis of the one or more financial goals of the financial plan holder, an identification of weaknesses in the financial holdings, and suggestions to the financial plan holder to remedy the weaknesses in the financial holdings;
    providing an embedded transaction option in the financial statement, the embedded transaction option embedded within the financial statement and enabling the financial plan holder to execute one or more secure financial transactions;
    providing an update option in the financial statement, the update option enabling the financial plan holder to modify the one or more financial goals; and
    providing an interactive avatar embedded within the financial statement, the interactive avatar performing an interactive multi-media presentation of the financial statement, the presentation including video, audio, and textual information, and the interactive avatar further providing an explanation of the embedded transaction option, guidance for the financial plan holder, training for the financial plan holder, and responding to questions submitted by the financial plan holder;
    wherein the interactive avatar changes its presentation dynamically when the financial plan holder modifies the one or more financial goals, corresponding to an update of: (a) the interactive multi-media presentation of the financial statement including the video, audio, and textual information, (b) the guidance for the financial plan holder, (c) the training for the financial plan holder, and (d) the responses to be provided to questions submitted by the financial plan holder; and
    wherein the one or more secure financial transactions are determined based on the one or more financial goals, and the one or more secure financial transactions are executed in real time and correspond to the one or more financial goals.

2. The method of claim 1, wherein the financial statement is accessed through a link provided in an email to the financial plan holder.

3. The method of claim 1, wherein the financial statement is provided through a website.

4. The method of claim 1, wherein the suggestions to the financial plan holder to remedy the weaknesses in the financial holdings are based on at least one of a questionnaire submitted by the financial plan holder, the analysis of the one or more financial goals, a financial prediction, historical performances of holdings, and a risk tolerance of the financial plan holder.

5. The method of claim 1, wherein the embedded transaction option is based on the suggestions to the financial plan holder to remedy the weaknesses in the financial holdings.

6. The method of claim 1, wherein the interactive avatar includes at least one of textual queries, selectable queries, speech recognition, and visual graphs.

7. The method of claim 1, wherein the financial statement further includes a transaction history listing various transactions into and out of an account of the financial plan holder.

8. The method of claim 7, wherein when the account of the financial plan holder contains multiple sub-accounts, the financial statement contains a summary of financial information for the multiple sub-accounts.

9. The method of claim 1, wherein the goals of the financial plan holder correspond to at least one of investment goals, retirement goals, or financial plan goals.

10. The method of claim 1, wherein the financial plan holder is an enterprise customer.

11. A system for providing a secure electronic transactionable multi-media financial planning statement to a financial plan holder via a computing device, the system comprising:

a receiving module configured to receive one or more financial goals from the financial plan holder through the computing device;

an analyzing module configured to analyze financial holdings of the financial plan holder using a computer processor;

a statement providing module configured to provide the financial statement to the financial plan holder via the computing device, the financial statement including a summary of financial information, the summary of financial information including an analysis of the financial holdings, an analysis of the one or more financial goals of the financial plan holder, an identification of weaknesses in the financial holdings, and suggestions to the financial plan holder to remedy the weaknesses in the financial holdings;

an embedded transaction providing module configured to provide an embedded transaction option embedded within the financial statement, the embedded transaction option enabling the financial plan holder to execute one or more secure financial transactions;

a financial goal update module configured to provide an update option in the financial statement, the update option enabling the financial plan holder to modify the one or more financial goals; and an interactive avatar providing module configured to provide an interactive avatar embedded within the financial statement, the interactive avatar performing an interactive multi-media presentation of the financial statement, the presentation including video, audio, and textual information, and the interactive avatar further providing an explanation of the embedded transaction option, guidance for the financial plan holder, training for the financial plan holder, and responding to questions submitted by the financial plan holder;

wherein the interactive avatar changes its presentation dynamically when the financial plan holder modifies the one or more financial goals, corresponding to an update of: (a) the interactive multi-media enabled interpretation of the financial statement including the video, audio, and textual information, (b) the guidance for the financial plan holder, (c) the training for the financial plan holder, and (d) the responses to be provided to questions submitted by the financial plan holder; and wherein the one or more secure financial transactions are determined based on the one or more financial goals, and the one or more secure financial transactions are executed in real time and correspond to the one or more financial goals.

12. The system of claim 11, wherein the statement providing module provides access to the financial statement through a link in an email to the financial plan holder.

13. The system of claim 11, wherein the statement providing module provides the financial statement through a website.

14. The system of claim 11, wherein the suggestions to the financial plan holder to remedy the weaknesses in the financial holdings are based on at least one of a questionnaire submitted by the financial plan holder, the analysis of the one or more financial goals, a financial prediction, historical performances of holdings, and a risk tolerance of the financial plan holder.

15. The system of claim 11, wherein the embedded transaction option is based on the suggestions to the financial plan holder to remedy the weaknesses in the financial holdings.

16. The system of claim 11, wherein the interactive avatar includes at least one of textual queries, selectable queries, speech recognition, and visual graphs.

17. The system of claim 11, wherein the financial statement further includes a transaction history listing various transactions into and out of an account of the financial plan holder.

18. The system of claim 17, wherein when the account of the financial plan holder contains multiple sub-accounts, the financial statement contains a summary of financial information for the multiple sub-accounts.

19. The system of claim 11, wherein the goals of the financial plan holder correspond to at least one of investment goals, retirement goals, or financial plan goals.

20. The system of claim 11, wherein the financial plan holder is an enterprise customer.

21. A non-transitory computer readable storage medium in which a program is recorded that causes a computer to execute a method comprising:

receiving one or more financial goals from the financial plan holder;

analyzing financial holdings of the financial plan holder;

providing a secure electronic transactionable multi-media financial planning statement to the financial plan holder, the financial statement including a summary of financial information, the summary of financial information including an analysis of the financial holdings, an analysis of the one or more financial goals of the financial plan holder, an identification of weaknesses in the financial holdings, and suggestions to the financial plan holder to remedy the weaknesses in the financial holdings;

providing an embedded transaction option in the financial statement, the embedded transaction option embedded within the financial statement and enabling the financial plan holder to execute one or more secure financial transactions;

providing an update option in the financial statement, the update option enabling the financial plan holder to modify the one or more financial goals; and providing an interactive avatar embedded within the financial statement, the interactive avatar performing an interactive multi-media presentation of the financial statement, the presentation including providing video, audio, and textual information, and the interactive avatar further providing an explanation of the embedded transaction option, guidance for the financial plan holder, training for the financial plan holder, and responding to questions submitted by the financial plan holder;

wherein the interactive avatar changes its presentation dynamically when the financial plan holder modifies the one or more financial goals, corresponding to an update of: (a) the interactive multi-media enabled interpretation of the financial statement including the video, audio, and textual information, (b) the guidance for the financial plan holder, (c) the training for the financial plan holder, and (d) the responses to be provided to questions submitted by the financial plan holder; and wherein the one or more secure financial transactions are determined based on the one or more financial goals, and the one or more secure financial transactions are executed in real time and correspond to the one or more financial goals.

\* \* \* \* \*